June 27, 1967  M. DOSEDLA ETAL  3,327,425
APPARATUS AND METHOD FOR SOILLESS CULTIVATION
AND GROWING OF GREEN PLANTS
Filed July 19, 1965  5 Sheets-Sheet 2

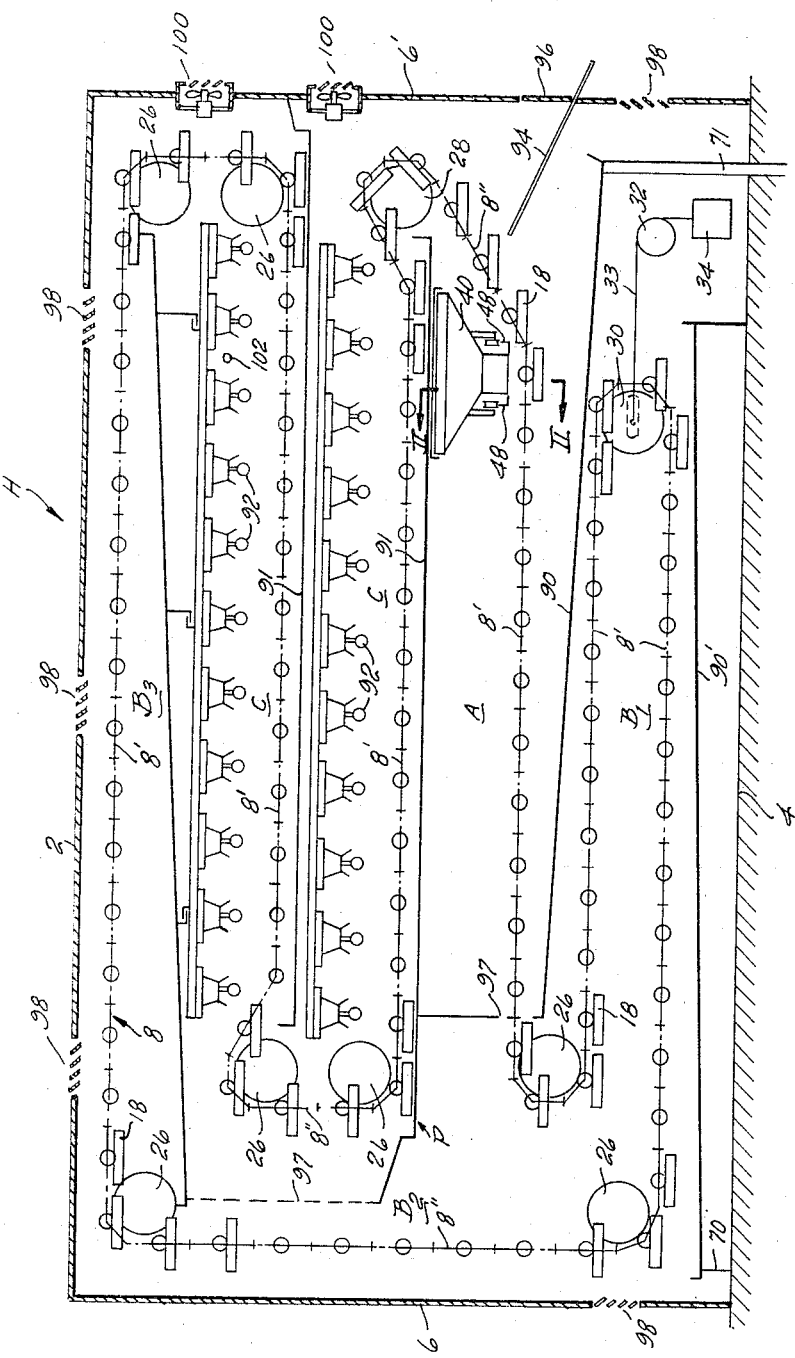

INVENTORS
Miroslav Dosedla
Cestmir Jelen
Miroslav Tichacek
Jiri Klusacek

BY Michael J. Striker

INVENTORS
Miroslav Dosedla
Cestmir Jelen
Miroslav Tichecek
Jiri Klusacek

Michael J. Striker
BY

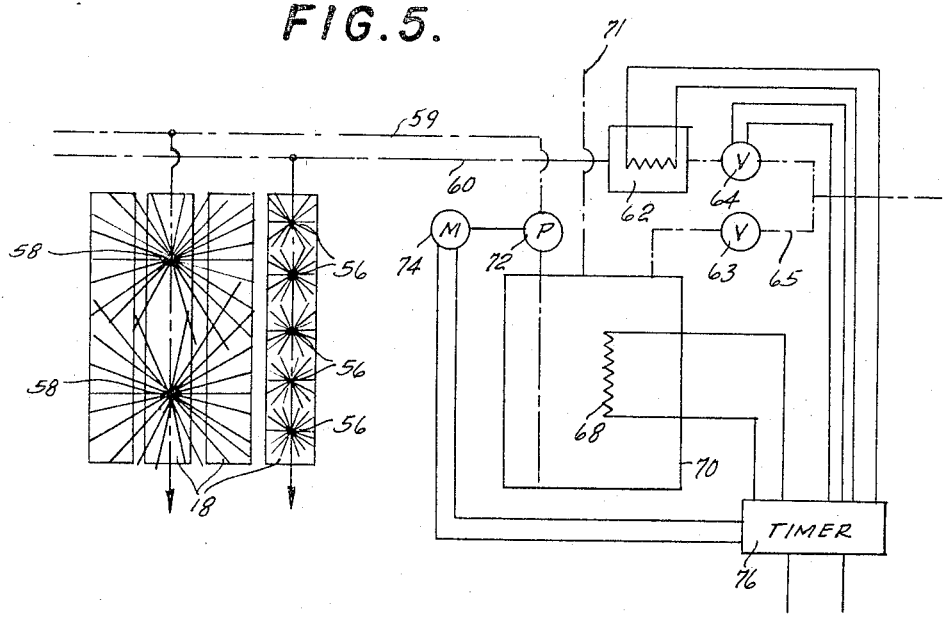
FIG.5.
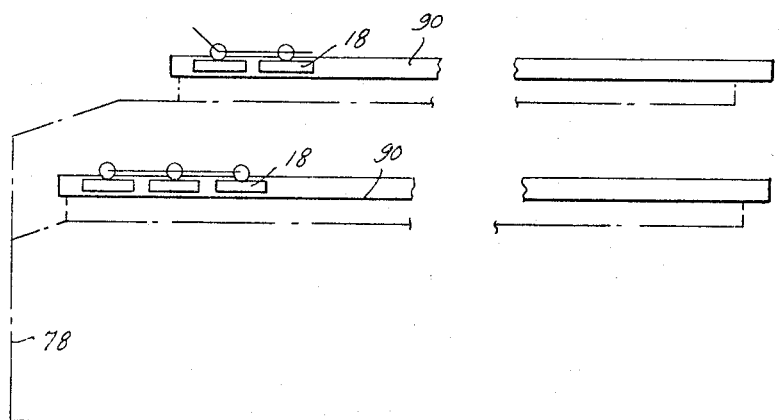
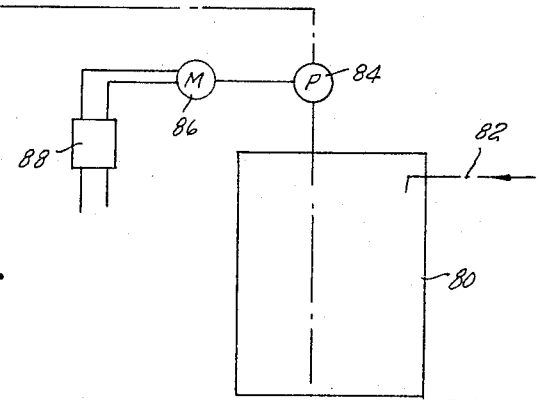
FIG.6.

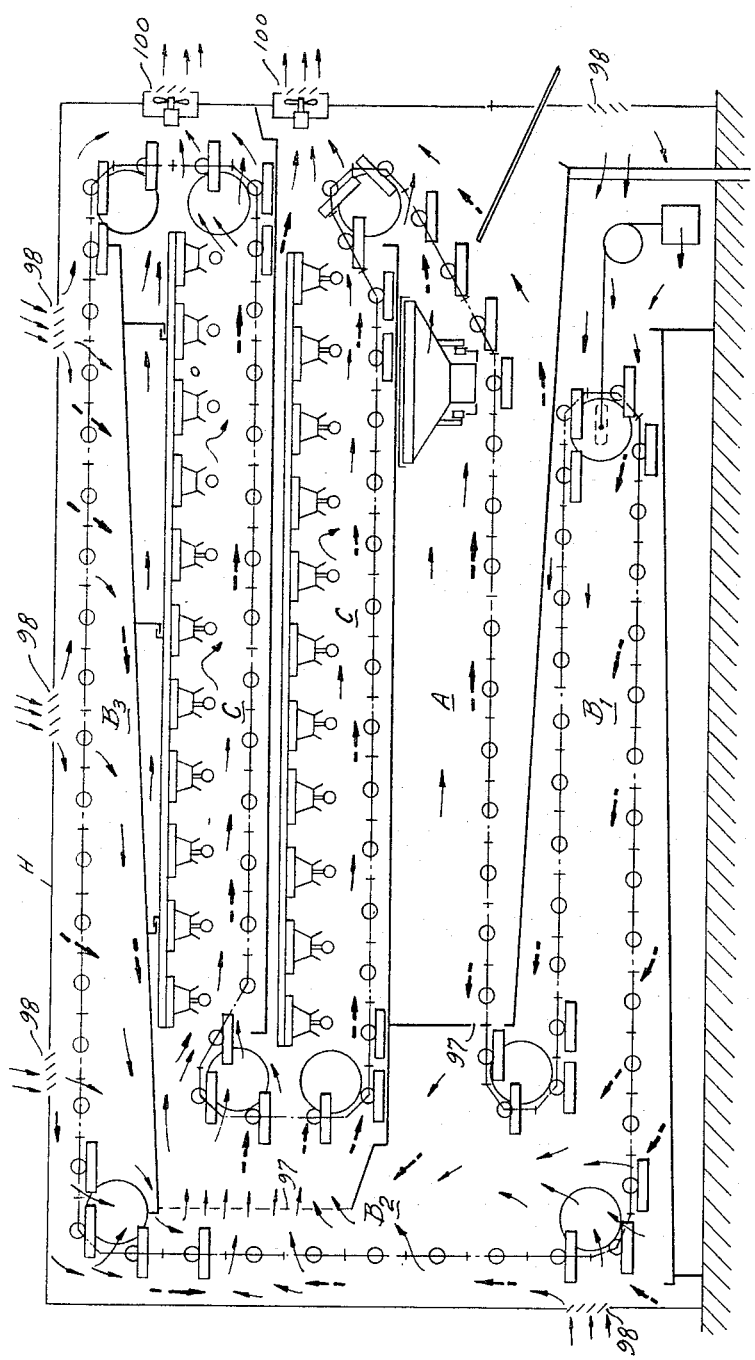

United States Patent Office 3,327,425
Patented June 27, 1967

3,327,425
APPARATUS AND METHOD FOR SOILLESS CULTIVATION AND GROWING OF GREEN PLANTS
Miroslav Dosedla, Cestmir Jelen, Miroslav Tichacek, and Jiri Klusacek, all of Decin, Czechoslovakia, assignors to Roudnicke Strojirny a Slevarny, Decin, Czechoslovakia
Filed July 19, 1965, Ser. No. 473,254
Claims priority, application Czechoslovakia, July 20, 1964, 4,191/64
13 Claims. (Cl. 47—1.2)

The present invention relates to an apparatus and a method for soilless cultivation and growing of green plants, particularly of green fodder in a continuous manner.

Various methods for soilless cultivation and growing of green plants are known. The known methods and apparatus for carrying out these methods have however the disadvantage that they require considerable manual labor, and/or that the apparatus for carrying out the method and especially the conveyor for carrying the seeds from which the plants are to be grown are only partly used for carrying the seeds during the growing process so that the productivity of the apparatus is a relatively low one.

It is an object of the present invention to provide for a method and an apparatus for carrying out the method for soilless cultivation and growing of green plants which avoids the disadvantages of methods and apparatus known in the art.

It is an additional object of the present invention to provide for a method and for an apparatus for carrying out the method in which the soilless cultivation and growing of green plants from seeds is carried out in a continuous and fully automatic manner.

It is a further object of the present invention to provide for a method and an apparatus for carrying out the method of the aforementioned kind in which the cultivation and growing of green plants from seeds proceeds at optimum conditions and in a climate created by the process itself.

With these objects in view, the method of the present invention for soilless cultivation and growing of plants, particularly green fodder, mainly comprises the steps of spreading seeds from which the plants are to be grown in a thin layer, wetting the layer of seeds with water, spraying the layer of seeds with a disinfecting solution, soaking the layer of seeds in a growth promoting liquid, and simultaneously illuminating the layer of seeds until plants are grown therefrom. Preferably, the air surrounding the seeds is maintained at each of the aforementioned steps at a predetermined temperature while the carbon dioxide developed during swelling of the seeds during the wetting and spraying steps is guided over the seeds during soaking thereof in the growth promoting liquid to further promote growing of plants from the seeds.

The apparatus for carrying out the method of the present invention mainly comprises a housing, endless conveyor means in the housing, means for moving the endless conveyor means along a predetermined path in the housing, seed dispensing means at one portion of the path for dispensing seeds onto the conveyor means, means for wetting the seeds on said conveyor means, means for spraying the seeds on the conveyor means with a disinfecting solution, means for soaking the seeds on the conveyor means in a growth promoting liquid, said last three means arranged on portions of the path successively passed through by the seeds on the conveyor means, illuminating means in the housing for illuminating part of the conveyor means and the seeds thereon to promote fast growth thereof, and means co-operating with the conveyor means for discharging the grown plants therefrom. Preferably, the housing is divided by partition means into three separate chambers which are successively traversed by the conveyor means. The conveyor means include preferably an endless chain conveyor on which a plurality of trays are suspended adjacent to each other and in such a manner that the trays on the conveyor are held in substantially horizontal position. The conveyor is preferably guided through the various chambers of the housing in such a manner that each of the chambers is traveled through by at least one horizontal run of the conveyor. The seeds are spread in a thin layer on the trays in a first one of the three chambers and subsequently thereto the seeds are wetted with water and sprayed with a disinfecting solution in the first one of the three chambers and in a second chamber traversed by the trays after leaving the first chamber, while during passage of the trays through the third chamber the seeds are soaked in a growth promoting solution and at the same time illuminated to promote fast growth of green plants from the seeds. The apparatus includes preferably further means for conditioning the air in each of the chambers that is to maintain the air in each chamber at a predetermined maximum temperature and control also the carbon dioxide and oxygen content in each of the chambers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic cross section through the apparatus according to the present invention;

FIG. 5 is a schematic partial view of the arrangement shown in FIG. 1 and FIGS. 4 and 5 illustrate especially the means for wetting and spraying the seeds on the trays;

FIG. 6 is a schematic partial view of the arrangement shown in FIG. 1 and showing especially the means for soaking the seeds on the trays in a growth promoting liquid;

FIG. 9 is a cross sectional view similar to FIG. 1 and showing especially the passage of air through the apparatus of the present invention.

Figure 3:
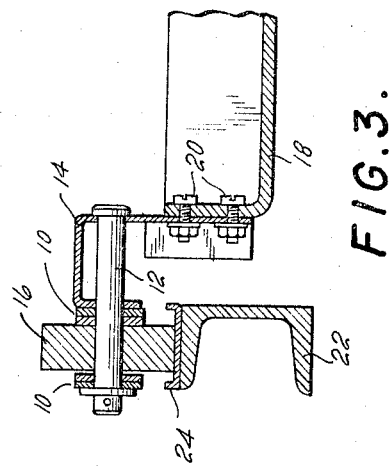
FIG. 3 is a partial cross section, drawn to an enlarged scale, and showing a detail of the conveyor means and part of a tray supported thereon.

Referring now to the drawings, and more specifically to FIG. 1 of the same, it will be seen that the apparatus according to the present invention comprises a housing H having a top wall 2, a bottom wall 4, and two opposite end walls 6 and 6' extending between the top and bottom wall of the housing. It is to be understood that the housing includes also a front and a rear wall so as to form a substantially closed housing. Partition means P are arranged within the housing and dividing the interior of the housing into three chambers, that is a first chamber A, a second chamber B, and a third chamber C. As can be seen from FIG. 1, the second chamber B comprises a first substantially horizontally arranged portion B1 extending along the bottom wall 4 of the housing, a second upright portion B2 extending along the left end wall 6 of the housing, as viewed in FIG. 1, and a third substantially horizontal portion B3 extending along the top wall 2 of the housing substantially from the left towards the right end wall thereof. The chambers A and C are arranged between the aforementioned first portion B1 and the third portion B3 of the second chamber, with the chamber C arranged above the chamber A.

Figure 2:
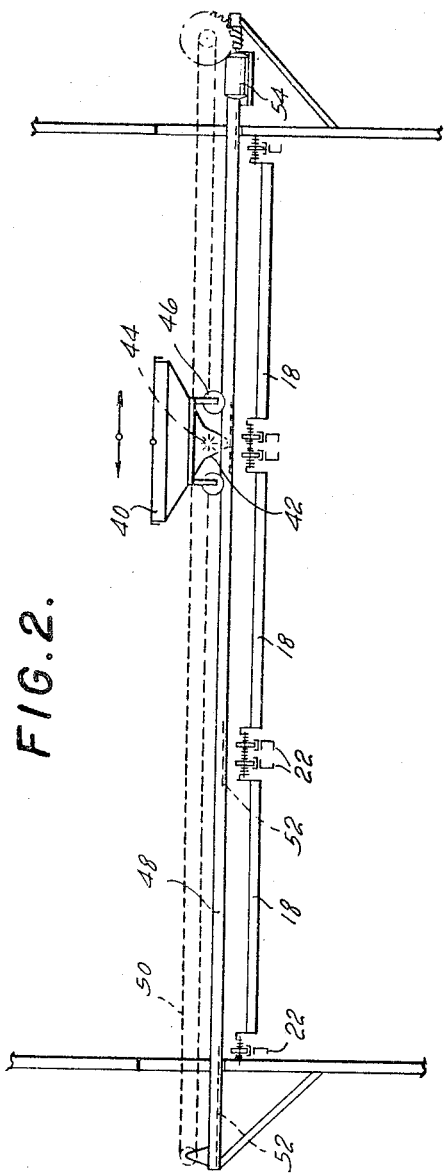
FIG. 2 is a schematic cross section taken along the line II—II of FIG. 1.
Figure 7:
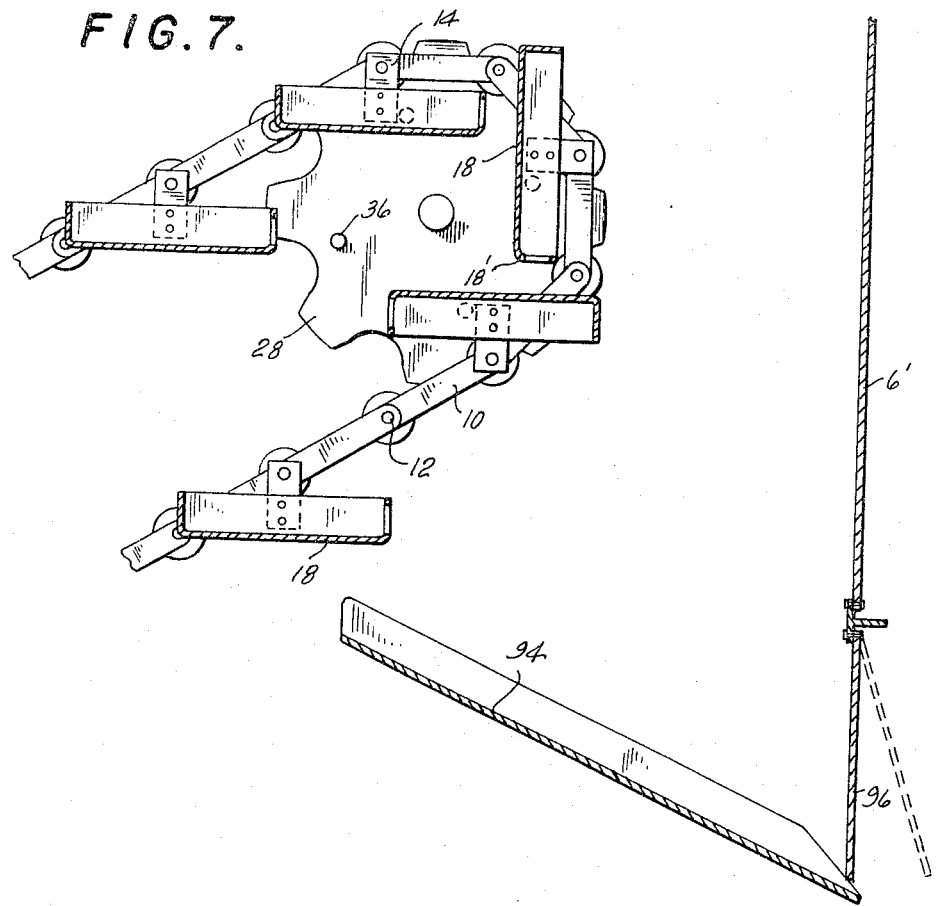
FIG. 7 is a partial view of the arrangement shown in FIG. 1, drawn to an enlarged scale, and illustrating the discharging means.

A plurality of endless conveyors 8 (FIGS. 1 and 2) are arranged side by side in the housing and each of the conveyors includes as best shown in FIGS. 3 and 7 a plurality of chain links 10 pivotally connected at overlapping ends to each other by pivot pins 12 and a roller 16 mounted on each pivot pin 12 between links of parallel chains. Each of the pivot pins 12 extends beyond the inner of the chains 10, as best shown in FIG. 3, and pivotally carries a bracket 14 connected at its lower end for instance by screws 20 to one side wall of a tray 18, the other side wall thereof is supported in the same manner on a bracket 14 carried by a similar chain, as best shown in FIG. 2. A plurality of trays 18 are thus supported closely adjacent to each other on adjacent conveyors 8 in such a manner that the bottoms of the trays 18 are maintained in a substantially horizontal position. The endless conveyors 8 are guided through the three aforementioned chambers in the housing along a predetermined path by means of sprocket wheels 26 turnably supported in the housing in any well known manner, not illustrated in the drawings, so that the conveyors 8 and the trays supported thereon are guided along a plurality of substantially horizontal runs 8′ connected by a plurality of runs 8″ extending transverse to the horizontal runs. As can be seen from FIG. 1 a horizontal run 8′ is arranged in the chamber A, two horizontal runs 8′ are arranged in the first portion B1 of the second chamber and the lower one of the runs 8′ in the portion B1 is connected by a substantially vertical run 8″ in the portion B2 of the second chamber to a horizonal run 8′ in the third portion B3 of the second chamber, while two horizontal runs 8′ are arranged in the third chamber C. The sprocket wheel 28 at the end of the lower horizontal run in the third chamber C is provided with a plurality of projections or abutment means 36 (FIG. 7) which engage the brackets 14 by means of which the trays 18 are suspended on the pins 12 in the manner as shown in FIG. 7 to cause the trays 18 as they pass over the sprocket wheel 28 to turn through substantially 180° for a purpose as will be explained later on. A plurality of rails 22 respectively extend parallel on the horizontal runs 8′ of the conveyor and each of the rails 22 carries fixed to the upper surface thereof in any convenient manner an elongated guide member 24 on which the rollers 16 are respectively guided in the manner as best shown in FIGS. 2 and 3. For reasons of clarity the rails 22 are not shown in FIG. 1. While the sprocket wheels 26 and 28 are mounted in the housing H turnably about fixed axes, the guide means for guiding the conveyors 8 include also one sprocket wheel 30, shown in FIG. 1 between the horizontal runs 8′ in the portion B1 of the second chamber, which is mounted in the housing H in a known manner movable in horizontal direction. A weight 34 connected by a cable 33 to the sprocket wheel 30 and guided over a guide roller 32 is provided for keeping the conveyors 8 in taut condition. One of the sprocket wheels 26 is driven by a motor, not shown in the drawings, so as to drive the endless conveyor means along the aforementioned path through the three chambers.

The apparatus of the present invention further includes seed dispensing means for dispensing a layer of seeds from which plants are to be grown onto each of the trays 18. These seed dispensing means comprise, as best shown in FIGS. 1 and 2, a hopper 40 having a lower open discharge end 42 and an agitating wheel 44 above the discharge end which is rotated about its axis by means not shown in the drawing. The hopper 40 is supported by rollers 46 on a pair of parallel rails 48 which extend normal to the direction of movement of the conveyors 8 through and beyond opposite side walls of the housing, and the hopper 40 is reciprocated along the rails 48 by means of an elongated endless chain or the like 50 which in turn is driven from a motor 54 in such a manner that the hopper 40 is reciprocated back and forth along the rails 48. A plurality of aprons 52 are arranged between the rails 48 in the manner as shown in FIG. 2 to prevent wasting of seeds and to assure that during reciprocation of the hopper 40 seeds are dispensed only into the trays 18.

The conveyors 8 are intermittently driven and the speed with which the hopper 40 is reciprocated along the rails 48 may be timed in such a manner that during movement of the hopper in one direction seeds are dispensed into one set of trays 18 located beneath the discharge opening of the hopper 40 whereas during movement of the hopper in the opposite direction a next set of trays is located beneath the discharge opening of the hopper.

Figure 4:
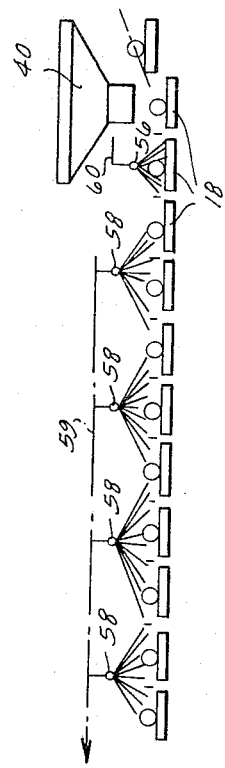
FIG. 4 is a schematic partial view of the arrangement shown in FIG. 1.

The apparatus includes further means for wetting the seeds dispensed by the seed dispensing means or the hopper 40 on the trays 18 as the latter travel away from the hopper along the predetermined path, and means for spraying the seeds on the trays with a disinfecting liquid. For reasons of clarity, the means for wetting the seeds and for spraying the same with the disinfecting liquid are not shown in FIG. 1 but such means are schematically illustrated in FIGS. 4 and 5. As can be seen from FIGS. 4 and 5, the means for wetting the seeds on the trays 18 with water comprise a plurality of spraying nozzles 56 arranged spaced from each other in longitudinal direction of the trays 18. As can be clearly seen from FIG. 4 these nozzles 56 are arranged to the left side, as viewed in FIG. 4, of the hopper 40 so that the trays after passing the discharge end of the hopper 40 are sprayed with water by the spraying nozzles 56. The nozzles 56 are supplied with water from a source of water not shown in the drawings by means of a conduit 60 which is controlled by a valve 64 and which leads through a water heater 62 so that the water before it arrives at the spraying nozzles 56 is heated to a predetermined temperature in the water heater 62. The valve 64 is preferably an automatic valve, for instance a solenoid operated valve, and operation of the valve 64 may be controlled from a timer 76 which opens and closes the valve 64 in a predetermined sequence. The water heater 62 is preferably heated by an electric heating coil which may also be operatively connected to the timer, or switching on and off of the heating coil may be performed in a well known manner from a thermostat in the water heater 62 so as to maintain the water discharged therefrom at a preselected temperature. Adjacent to the spray nozzles 56 are a plurality of rows of spray nozzles 58 which are connected by means of a conduit 59 to a tank 70 containing a disinfecting liquid, for instance a solution of 0.01% of formaline in water or a feeble, rose-colored solution of potassium permanganate in water. The tank 70 may be supplied with water from a source of water, not shown in the drawing, through a conduit 65 which is preferably controlled by a valve 63 connected in a manner known in the art to a level indicator, not shown in the drawing, in the tank 70 so as to keep the level of the solution in the tank 70 at a predetermined height. A pump 72 driven by a motor 74 pumps the solution from the tank 70 into the conduit 59. The motor 74 may be connected to the timer 76 so that the latter starts and stops the motor 74 at preselected time inervals in such a manner thta solution is pumped through the conduit 59 to the spray nozzles 58 only when the valve 64 is closed and vice versa. The tank 70 includes also heating means, preferably in the form of an electric heating coil 68, located in tank 70 and which may be controlled by the timer 76 or by an additional thermostat for keeping the solution in the tank at a predetermined temperature.

It is to be understood that spray nozzles 56 and 58 are arranged along the horizontal run 8′ in the chamber A and at least along the horizontal runs 8' in the portion B1 of the second chamber. As can be seen from FIG. 1, the partition means P defining the portion B1 of the second chamber include a pair of oppositely inclined wall portions 90 and 90' which are adapted to collect the water or the solution sprayed by the spraying nozzles 56 and 58 on the trays passing through the chambers A and B and conduits 71 and 71' respectively communicating with the lower ends of the wall portions 90 and 90' lead the solution collected on these wall portions back to the tank 70. The conduits 71 and 71' may be provided with two-way valves which may be automatically operated from the timer 76 in such a manner that during spraying of the trays with water through the nozzle 56, the waste water is discharged to some discharge place outside the tank 70 and only the disinfecting solution is guided back to the tank 70.

The apparatus includes further means for soaking the seeds on the trays with a growth promoting liquid after the seeds have been sprayed with water and disinfecting solution in the manner as described above. The means for soaking the seeds in the trays 18 in a growth promoting liquid include a plurality of elongated troughs 91 arranged along the horizontal runs 8' in the third chamber C. The horizontal runs 8' in the third chamber C are guided over the sprocket wheels 26 and the sprocket wheel 28, and if necessary additional guide rollers, not shown in the drawing, in such a manner that the trays supported thereon will be immersed in the liquid in the elongated troughs 91. The lower one of the troughs 91 may be constructed so that the bottom wall of this trough forms part of the partition separating the chamber C from the chamber A.

Figure 8:
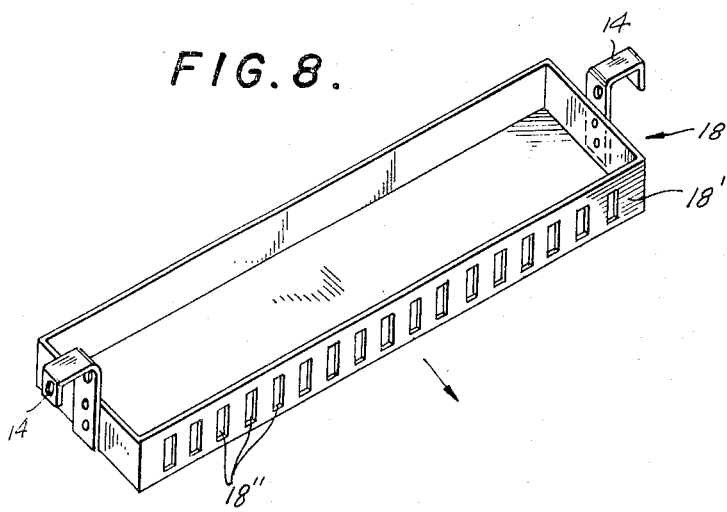
FIG. 8 is a perspective view of one of the trays on the conveyor means and drawn to an enlarged scale.

The growth promoting solution is supplied to the troughs 91 from a tank 80 by means of a pump 84 which pumps the growth promoting liquid from the tank 80 through conduits 78 into the troughs 91. The pump 84 is driven from a reversible motor 86 controlled by a timer 88 in such a manner that during a predetermined time period growth promoting liquid is pumped from the tank 80 through the conduits 78 to the troughs 91 and afterwards again discharged through the conduits 78 into the tank 80. A conduit 82 supplies the tank 80 with water, and the growth promoting liquid is preferably a solution of various salts in water. The growth promoting solution may contain the following amounts of salts for each ten gallons of liquid in the tank 80:

Calcium nitrate $Ca(NO_3)_2$ _____oz__ 2,165
Dihydrogen potassium orthophosphate $KH_2PO_4$
  _____oz__ 0,3345
Magnesium sulphate $MgSO_4$ _____oz__ 0,682
Potassium chloride $KCl$ _____oz__ 0,1603
Ferric chloride (iron perchloride) $FeCl_3$ _____ Trace Each of the trays 18 is formed in a front wall 18' thereof, which leads in direction of travel of the tray 18, with a plurality of substantially vertical, elongated openings 18", as best shown in FIG. 8, so that growth promoting liquid in the troughs 91 may pass through these openings 18" into the interior of the respective tray 18 so that the seeds dispensed on the bottom of the tray are thoroughly soaked in the growth promoting liquid.

Illuminating means are arranged above the horizontal runs 8' in the chamber C to illuminate the seeds while they are soaked in the growth promoting liquid and these eliminating means include a plurality of electric lamps 92 arranged spaced from each other in longitudinal direction of the horizontal runs 8' of the conveyor and in transverse direction so as to extend also in the transverse direction over the whole length of the trays. The lamps 92 are arranged and constructed so that the intensity of the light in the chamber C is about 550 lumen per square foot in a height of 4¾ feet above the bottom of the cultivating trays 18.

Discharge means for discharging the plants grown from the seeds on the trays 18 are arranged at the right end, as viewed in FIG. 1, of the lower one of the troughs 91, and these discharge means include, as mentioned before, the sprocket wheel 28 provided with abutment means in the form of pins 36 engaging the brackets 14 by means of which the trays 18 are suspended on the conveyor 8 in such a manner so as to turn the trays 18 through an angle of substantially 180° as they pass over sprocket wheel 28. During such turning of the trays 18 the grown plants therein will slide along the bottom wall of each tray as the same is turned from the horizontal to the vertical position as shown in FIG. 7 and during further turning of the tray these plants will slide along the front wall 18' of the trays whereby any roots of the plants extending through the openings 18" in the front wall 18' will be sheared off by the portion of the front wall 18' defining the upper edges of the openings 18". The discharge means include further a downwardly inclined chute 94 arranged beneath the sprocket wheel 28 to receive the plants discharged from the trays 18 as the latter are turned about and the wall 6' of the housing H includes a yieldable wall portion 69 arranged opposite the lower end of the inclined chute 94 in such a manner so as to yield under the weight of plants sliding downwardly on the chute 94 so that the plants are discharged through the opening normally closed by the yieldable wall portion 96 to the outside of the housing into containers or transporting means not shown in the drawing.

The opposite end walls 6 and 6' as well as the top wall 2 of the housing H are provided with a plurality of openings or louvres to permit entrance of fresh air into the interior of the housing H and the partition means P are at the portions thereof defining the left end, as viewed in FIG. 1, of the chambers A and C with similar openings or louvres 97 providing communication between the upright portion B2 of the second chamber and the chambers A and C, respectively, while in the region of the right end of the chamber C, as viewed in FIG. 1, blower means 100 are provided which are constructed to discharge air from the region of the right end of the chamber C to the outside of the housing H. Temperature sensing means 102 of any known construction are arranged in an upper part of the chamber C and temperature sensing means 102 are operatively connected to the blower means 100 in a known manner to start and stop the latter according to the temperature sensed by the temperature sensing means 102 in the chamber C.

The operation of the above-described apparatus will be obvious from the above description. At the start of the operation seeds are distributed on the trays 18 located at any instant beneath the discharge opening of the hopper 40, while the latter is reciprocated in direction transverse to the elongation of the conveyor 8 on the guide rails 48 so that the bottoms of the trays 18 are covered by a thin layer of seeds. The bottoms of the cultivating trays 18 are covered with seeds in the amount of about 0.8 pound per square foot so that in each portion of the layer about 2 seeds are superimposed upon each other. As mentioned before, the conveyor 8 is intermittently operated and the conveyor may be moved in longitudinal direction for 1½ minutes and be maintained before the next movement at stand-still for a time period of about 1½ hours. After the bottoms of the trays 18 have been covered with a layer of seeds in the aforementioned manner, these layers of seeds in the respective trays are first sprayed or washed with water of a temperature of about 55° F. and then sprayed with water of a temperature of 64° to 68° F. by means of the nozzles 56. Subsequently thereto the seeds are sprayed with disinfecting solution of a composition as mentioned before and which is maintained at a temperature of 64°–68° F. This alternating spraying with water and with disinfecting solution is performed in the chamber A and also at least in the portion B1 of the second chamber B in which the seeds thus sprayed will germinate. Such spraying of the seeds in the trays 18 may also be continued during the passage of the trays through the portions B2 and B3 of the second chamber. From the upper portion B3 of the second chamber the trays 18 are transported along the horizontal runs 8' in the third chamber C where the trays 18 are at least partly immersed in the growth promoting liquid in the troughs 91. During immersion of the trays 18 and the seeds thereon in the trough 91, the seeds are at the same time illuminated by the illuminating means 92 above the troughs 91. The lamps forming the illuminating means 92 are preferably incandescent lamps and the heat radiated by these lamps will heat up the chamber C to a temperature which is higher than the temperature in the chambers A and B. The temperature sensing means 102 will sense the temperature in the chamber C and start the blowers 100 when the temperature in the chamber C surpasses a predetermined temperature. The temperature sensing means 102 is preferably set in such a manner so as to maintain the temperature in the chamber C approximately between 70° and 75° F. In the chamber A the temperature will be slightly lower than the temperature maintained in the chamber C, and the temperature in the chamber A will be due to heat radiation from the chamber C and due to the intensive breathing of the swelling seeds and due to the spraying thereof with warm water maintained at a temperature of approximately 64°–68° F. Since during operation of the blowers 8 a slight under pressure will be maintained in the region of the housing adjacent to the blowers, fresh air will be sucked through the openings 98 in the walls of the housing partly defining the chamber B, the temperature in this chamber will be maintained at a slightly lower temperature than in the chamber A at least in the portion B1 of the chamber B and this portion may be maintained at a temperature of about 55° F. which temperature rises in the upper portions of the chamber B to a temperature of about 68° F. To positively maintain the temperature in the portion B1 at a lower temperature than in the chamber A an additional fan may be located in the opening 89 in the end wall 6 of the housing which may be controlled by an additional thermostat, not shown in the drawing, located in the portion B1 of the second chamber and connected to the fan in such a manner that the fan sucks fresh air from the outside into the interior of the portion B1 of the second chamber whenever the temperature therein exceeds a predetermined limit.

During the swelling of the seeds in the chambers A and B carbon dioxide is developed whereas the growing plants on the trays 18 in the chamber C will develop oxygen. The operation of the fans 100 will not only maintain the aforementioned predetermined temperature in the chamber C, but during operation of the fans 100 oxygen accumulating in the chamber C will also be discharged therefrom, while carbon dioxide developed in the chamber A will be sucked through the air opening 97 in the left end wall of the chamber A, as viewed in FIGS. 1 and 9 into a portion B2 of the second chamber and the carbon dioxide developed in the second chamber or transported from the chamber A into the second chamber will be sucked during operation of the fans 100 through the openings 97 in the left end wall, as viewed in FIGS. 1 and 9 into the chamber C so that the carbon dioxide, the high concentration of which in the chambers A and B would be objectionable, supports the growth of the plants in the growing chamber C. FIG. 9 illustrates the air flow through the various chambers produced during operation of the blower means or fans 100. The full line arrows shown in FIG. 9 indicate the flow of fresh air as well as the air enriched with oxygen through the chambers, whereas the arrows shown in broken lines indicate the circulation of air having a high percentage of carbon dioxide. The oxygen generated in the course of the illuminating phase in the chamber C can also be advantageously passed to chambers A and B where it supports the germination of the seeds during maintenance thereof in darkness. Appropriate baffle plates, not shown in the drawing, may be provided for this purpose. The concentration of carbon dioxide in the chambers A and B varies from 0.03% (when fresh air is supplied) to a maximum of 0.47% and the concentration of oxygen in the chamber C increases during one hour by 0.01 to 0.3%.

At the end of the lower run in the chamber C, the trays with a carpet of grown plants therein are turned in the manner as described above through about 180° by means of the sprocket wheel 28 and the abutment means 36 thereon whereby the roots grown through the openings 18'' in the front wall of the turned-about tray 18 are torn off in the course of the discharge by the weight of the grown plants in the manner as described before and the grown plants are dropped onto the chute 94 to be discharged through the yieldable wall portion 96 to the outside of the housing H.

The total time between placing the seeds on the cultivating trays and discharging of the green plants grown from the seeds in an apparatus built according to the present invention is approximately 160 hours.

It will be understood that each of the elements described above, or two or more together, may also find a useful application in other types of method and apparatus for soilless cultivation of plants, particularly green fodder from seeds differing from the types described above.

While the invention has been illustrated and described as embodied in method and apparatus for soilless cultivation of plants, particularly green fodder, in a continuous fully automatic manner, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for soilless cultivation and growing of plants, particularly of green fodder, comprising, in combination, a housing; partition means in said housing and dividing the latter in three chambers; endless conveyor means in said housing; means for guiding and moving said endless conveyor means along a predetermined path so that said conveyor means passes successively through said three chambers; seed dispensing means along said path in a first one of said three chambers for dispensing seeds onto said conveyor means; means for wetting the seeds on said conveyor means; means for spraying the seeds on said conveyor means with a disinfecting solution, said last mentioned two means arranged in said first chamber and in a second chamber traveled through by said conveyor means after leaving said first chamber; means for soaking the seeds on said conveyor means in a growth promoting liquid arranged in the third of said three chambers; illuminating means in said third chamber above the portion of said conveyor means passing therethrough; and discharging means cooperating with said conveyor means at the end of said third chamber for discharging the grown plants therefrom.

2. Apparatus for soilless cultivation and growing of plants, particularly of green fodder, comprising, in combination, a housing; partition means in said housing and dividing the latter in three chambers; endless conveyor means in said housing; means for guiding and moving said endless conveyor means along a predetermined path so that said conveyor means passes successively through said three chambers; seed dispensing means along said path in a first one of said three chambers for dispensing seeds onto said conveyor means; means for wetting the seeds on said conveyor means; means for spraying the seeds on said conveyor means with a disinfecting solution, said last mentioned two means arranged in said first chamber and in a second chamber traveled through by said conveyor means after leaving said first chamber; means for soaking the seeds on said conveyor means in a growth promoting liquid arranged in the third of said three chambers; illuminating means only in said third chamber above the portion of said conveyor means passing therethrough; means for conditioning the atmosphere in said three chambers and for maintaining in each chamber a predetermined temperature; and discharging means cooperating with said conveyor means at the end of said third chamber for discharging the grown plants therefrom.

3. Apparatus for soilless cultivation and growing of plants, particularly green fodder, comprising, in combination, a housing; a power driven endless conveyor in said housing; guide means in said housing for guiding said endless conveyor along a predetermined path including a plurality of superimposed substantially horizontally arranged runs connected by a plurality of runs extending transverse to said horizontally arranged runs; a plurality of trays suspended adjacent each other on said endless conveyor in such a manner that the bottoms of said trays will be maintained in substantially horizontal position during transport thereof by said conveyor; seed dispensing means at one portion of said path for dispensing a layer of seeds on each of said trays; means for wetting the seeds on said trays; means for spraying the seeds on said trays with a disinfecting solution, said last two means arranged along runs following said one portion of said path; means for soaking the seeds on said trays with a growth promoting liquid, said soaking means arranged along at least one horizontal run following said runs along which said wetting and spraying means are arranged; illuminating means arranged at least over said one horizontal run; and discharging means following said one horizontal run and cooperating with said trays suspended on said conveyor for discharging the grown plants therefrom.

4. An apparatus as set forth in claim 3, wherein a plurality of conveyors are arranged alongside each other and substantially parallel to each other and each carrying a plurality of trays, said plurality of trays on said plurality of conveyors being respectively aligned with each other in direction transverse to their movement, and wherein said seed dispensing means comprises a hopper, support means for said hopper supporting the latter movable in said transverse direction over said plurality of conveyors, and drive means operatively connected to said hopper for moving the same back and forth along said support means.

5. An apparatus as set forth in claim 3 and including rail means supported in said housing and extending substantially parallel to said horizontal runs of said conveyor, and roller means connected to said trays and engaging said rails during travel of said trays along said horizontal runs.

6. Apparatus for soilless cultivation and growing of plants, particularly green fodder, comprising, in combination, a housing; partition means in said housing and dividing the latter in three chambers; a power driven endless conveyor in said housing; guide means in said housing for guiding said endless conveyor along a predetermined path including a plurality of superimposed substantially horizontally arranged runs connected by a plurality of runs extending transverse to said horizontally arranged runs and arranged in such a manner so that said conveyor passes successively through said three chambers with at least one horizontally arranged run in each of said chambers; a plurality of trays suspended adjacent each other on said endless conveyor in such a manner that the bottoms of said trays will be maintained in substantially horizontal position during transport thereof by said conveyor; seed dispensing means along said path in a first one of said three chambers for dispensing seeds onto said trays; means for wetting the seeds on said trays; means for spraying the seeds on said trays with a disinfecting solution, said last mentioned two means arranged in said first chamber and in a second chamber traveled through by said conveyor after leaving said first chamber; means for soaking the seeds on said trays in a growth promoting liquid, said last mentioned means arranged along a horizontal run in the third of said three chambers; illuminating means in said third chamber above said horizontal run for illuminating the seeds on said trays to promote fast growth thereof; and discharging means at the end of said third chamber and cooperating with said trays for discharging the grown plants therefrom.

7. An apparatus as set forth in claim 6, wherein said housing has a top wall, a bottom wall and a pair of opposite end walls between said top and bottom walls, and wherein said second chamber has a portion extending along said bottom wall of said housing, a second portion extending upwardly along one of said end walls, and a third portion extending along said top wall from said one end wall up to the other of said end walls.

8. An apparatus as set forth in claim 7, wherein said first and said third chambers are arranged between said first and third portions of said second chamber with said third chamber arranged above said first chamber.

9. An apparatus as set forth in claim 8, wherein said means for conditioning the atmosphere in said chambers include air inlet openings in said walls of said housing and communicating with said second chamber, blower means communicating with said third chamber for discharging air therefrom; and air passage means providing communication between said chambers.

10. An apparatus as set forth in claim 6, wherein said means for soaking the seeds include a plurality of elongated troughs in said third chamber, and conduit means for circulating a growth promoting liquid through said troughs, and wherein said guide means are arranged so that said trays are at least partly immersed in said growth promoting liquid in said troughs during passage of said trays along said horizontal runs of said conveyor in said third chamber, said trays being formed at least in one wall thereof with openings permitting said growth promoting liquid to pass in and out of said trays during passage of said trays through said troughs.

11. Apparatus for soilless cultivation and growing of plants, particularly green fodder, comprising, in combination, a housing; partition means in said housing and dividing the latter in three chambers; a power driven endless conveyor in said housing; guide means in said housing for guiding said endless conveyor along a predetermined path including a plurality of superimposed substantially horizontally arranged runs connected by a plurality of runs extending transverse to said horizontally arranged runs and arranged in such a manner so that said conveyor passes successively through said three chambers with at least one horizontally arranged run in each of said chambers; a plurality of trays suspended adjacent each other on said endless conveyor in such a manner that the bottoms of said trays will be maintained in substantially horizontal position during transport thereof by said conveyor; seed dispensing means along said path in a first one of said three chambers for dispensing seeds onto said trays; means for wetting the seeds on said trays; means for spraying the seeds on said trays with a disinfecting solution, said last mentioned two means arranged in said first chamber and in a second chamber traveled through by said conveyor after leaving said first chamber; means for soaking the seeds on said trays in a growth promoting liquid, said last mentioned means arranged along a horizontal run in the third of said three chambers; illuminating means in said third chamber above said horizontal run for illuminating the seeds on said trays to promote fast growth thereof; and discharging means at the end of said third chamber and cooperating with said trays for discharging the grown plants therefrom, said discharging means including a sprocket wheel forming part of the guide means for guiding said conveyor and being arranged at that end of said third chamber which is last traveled through by said trays, and abutment means on said sprocket wheel engaging said trays upon reaching said sprocket wheel for turning said trays through an angle of substantially 180° as they pass over said sprocket wheel.

12. Apparatus for soilless cultivation and growing of plants, particularly green fodder, comprising, in combination, a housing; partition means in said housing and dividing the latter in three chambers; a power driven endless conveyor in said housing; guide means in said housing for guiding said endless conveyor along a predetermined path including a plurality of superimposed substantially horizontally arranged runs connected by a plurality of runs extending transverse to said horizontally arranged runs and arranged in such a manner so that said conveyor passes successively through said three chambers with at least one horizontally arranged run in each of said chambers; a plurality of trays suspended adjacent each other on said endless conveyor in such a manner that the bottoms of said trays will be maintained in substantially horizontal position during transport thereof by said conveyor; seed dispensing means along said path in a first one of said three chambers for dispensing seeds onto said trays; means for wetting the seeds on said trays; means for spraying the seeds on said trays with a disinfecting solution, said last mentioned two means arranged in said first chamber and in a second chamber traveled through by said conveyor after leaving said first chamber; means for soaking the seeds on said trays in a growth promoting liquid, said last mentioned means arranged along a horizontal run in the third of said three chambers; illuminating means in said third chamber above said horizontal run for illuminating the seeds on said trays to promote fast growth thereof; and discharging means at the end of said third chamber and cooperating with said trays for discharging the grown plants therefrom, said discharging means including a sprocket wheel forming part of the guide means for guiding said conveyor and being arranged at that end of said third chamber which is last traveled through by said trays, abutment means on said sprocket wheel engaging said trays upon reaching said sprocket wheel for turning said trays through an angle of substantially 180° as they pass over said sprocket wheel, an inclined chute having an upper end arranged below said sprocket wheel for receiving the plants discharged from said turned about trays and a lower end adjacent one wall of said housing, and a yieldable wall portion in said wall in front of said lower end of said chute permitting the plants sliding down on said chute to pass to the outside of said housing.

13. An apparatus as set forth in claim 12, wherein said trays have side walls extending transverse to the direction of movement of the conveyor, and wherein that side wall of each tray which is the leading side wall in said direction is formed with a plurality of elongated openings.

References Cited

UNITED STATES PATENTS

| | | | |
|---|---|---|---|
| 1,793,626 | 2/1931 | McCormick | 47—17 |
| 2,244,677 | 6/1941 | Cornell | 47—17 |
| 2,824,410 | 2/1958 | Daw | 47—1 |
| 3,254,447 | 6/1966 | Ruthner | 47—1.2 |
| 3,276,163 | 10/1966 | Oepen et al. | 47—1.2 |
| 3,284,948 | 11/1966 | Kyle | 47—1.2 |
| 3,300,896 | 1/1967 | Lunstroth | 47—1.2 |

FOREIGN PATENTS

| | | |
|---|---|---|
| 163,369 | 6/1955 | Australia. |
| 301,474 | 10/1917 | Germany. |

ABRAHAM G. STONE, *Primary Examiner.*

ROBERT E. BAGWILL, *Examiner.*